United States Patent
Isaacs et al.

(10) Patent No.: US 10,825,051 B2
(45) Date of Patent: Nov. 3, 2020

(54) DYNAMIC BILLBOARD ADVERTISEMENT FOR VEHICULAR TRAFFIC

(71) Applicant: INTERNATIONAL BUSINESS MACHINES CORPORATION, Armonk, NY (US)

(72) Inventors: Phillip D. Isaacs, Rochester, MN (US); Eric V. Kline, Rochester, MN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 15/834,212

(22) Filed: Dec. 7, 2017

(65) Prior Publication Data

US 2019/0088176 A1     Mar. 21, 2019

Related U.S. Application Data

(63) Continuation of application No. 15/706,365, filed on Sep. 15, 2017.

(51) Int. Cl.
    *G06Q 30/02*    (2012.01)
    *G09F 13/02*    (2006.01)
    *G09F 27/00*    (2006.01)

(52) U.S. Cl.
    CPC ......... *G06Q 30/0265* (2013.01); *G09F 13/02* (2013.01); *G09F 2027/001* (2013.01); *G09F 2027/002* (2013.01)

(58) Field of Classification Search
    CPC .................................. G06Q 30/0265
    See application file for complete search history.

(56) References Cited

U.S. PATENT DOCUMENTS

| | | | |
|---|---|---|---|
| 2002/0021459 A1* | 2/2002 | McAbee | G09F 21/04 359/1 |
| 2003/0046158 A1 | 3/2003 | Kratky | |
| 2008/0055285 A1 | 3/2008 | Ishikawa | |
| 2010/0036717 A1 | 2/2010 | Trest | |

(Continued)

FOREIGN PATENT DOCUMENTS

EP     2541344 A1     1/2013

OTHER PUBLICATIONS

Becky Ferreira, The Billboards of the Future Are 'Trixelated' 3D Holograms—Motherboard https://motherboard.vice.com/ (Year: 2015).*

(Continued)

*Primary Examiner* — John Van Bramer
*Assistant Examiner* — Brendon Beheshti
(74) *Attorney, Agent, or Firm* — Steven M. Bouknight

(57) ABSTRACT

A method, computer system, and a computer program product for dynamic billboard advertisements is provided. The present invention may include determining that a vehicle is approaching a display location. The present invention may then include receiving a plurality of data associated with the approaching vehicle. The present invention may then include resolving an advertisement to be displayed based on the received plurality of data. The present invention may then include establishing the display location based on the received plurality of data. The present invention may finally include projecting the resolved advertisement at the established display location.

7 Claims, 7 Drawing Sheets

(56) References Cited

U.S. PATENT DOCUMENTS

| | | | |
|---|---|---|---|
| 2010/0223112 | A1 | 9/2010 | Griffin et al. |
| 2012/0235883 | A1 | 9/2012 | Border et al. |
| 2013/0268357 | A1 | 10/2013 | Heath |
| 2014/0306994 | A1 | 10/2014 | Brown et al. |
| 2015/0039415 | A1 | 2/2015 | Boldyrev et al. |
| 2017/0371608 | A1* | 12/2017 | Wasserman ............... G06F 3/14 |
| 2019/0088175 | A1 | 3/2019 | Isaacs |
| 2019/0213931 | A1* | 7/2019 | Brubaker .............. G09F 21/048 |

OTHER PUBLICATIONS

IBM, "List of IBM Patents or Patent Applications Treated as Related (Appendix P)," Apr. 11, 2018, p. 1-2.

Isaacs et al., "Dynamic Billboard Advertisement For Vehicular Traffic," Application and Drawings, filed on Sep. 15, 2017, 32 Pages, U.S. Appl. No. 15/706,365.

Dynamicvideollc, "Best Buy Dynamic Video Billboard Sample," YouTube, Dec. 15, 2009, p. 1, https://www.youtube.com/watch?v=6yaW0yl9fk0, Accessed on Sep. 11, 2017.

Ferreira, "The Billboards of the Future Are 'Trixelated' 3D Holograms," Motherboard, Jan. 15, 2015, p. 1-4, https://motherboard.vice.com/en_us/article/z4mw99/the-trixelated-3d-billboards-of-the-future, Accessed on Sep. 11, 2017.

Gallo, "Michael Jackson Hologram Rocks Billboard Music Awards: Watch & Go Behind the Scenes," Billboard, May 18, 2014, p. 1-2, http://www.billboard.com/articles/events/bbma-2014/6092040/michael-jackson-hologram-billboard-music-awards, Accessed on Sep. 11, 2017.

Higgins, "Holographic Billboards in Singapore," The Australian, May 17, 1994, p. 1-2, edgepolitics, http://www.edgepolitics.com/?page_id=774, Accessed on Sep. 11, 2017.

Javahelponline, "The Dynamic Billboard Applet," Online Java Project Help, Sep. 18, 2014, p. 1-3, https://javahelponline.com/the-dynamic-billboard-applet-3711, Accessed on Sep. 11, 2017.

Kessler, "Startup Aims to Build Billboards That Target You, Personally," Mashable—Entertainment, Apr. 15, 2011, p. 1-2, Mashable, Inc., http://mashable.com/2011/04/16/smart-billboard/#SjISFULhpiqd, Accessed on Sep. 11, 2017.

Maadelat et al., "Do Companies Look at Targeted Outdoor Advertising?," Startups.co Answers, 2013, p. 1-3, https://www.startups.co/answers/694/outdoor-targeted-advertising, Accessed on Sep. 11, 2017.

Mell et al., "The NIST Definition of Cloud Computing," National Institute of Standards and Technology, Sep. 2011, p. 1-3, Special Publication 800-145.

Perúeduca, "How to update your information in PerúEduca," PerúEduca in your School Tutorial, 2016, p. 1-19, PerúEduca Digital System for Knowledge.

Zebra Imaging, Inc. Releases High-Speed Monochrome Imager Model M1 for Production of 3D Holographic Images, May 11, 2005, Business Wire May 11, 2005:NA., (Year: 2005).

\* cited by examiner

DYNAMIC BILLBOARD ADVERTISEMENT FOR VEHICULAR TRAFFIC

BACKGROUND

The present invention relates generally to the field of computing, and more particularly to electronic advertisements.

A billboard is a large outdoor advertising screen that may be placed in a high traffic area to display an advertisement along a roadside. The advertisement displayed on a billboard may intend to attract the attention of motorists or pedestrians, and may include promotional material, upcoming events, and new technology, among other things. Billboard advertising may depend on the location of the billboard and the intended or targeted audience.

SUMMARY

Embodiments of the present invention disclose a method, computer system, and a computer program product for dynamic billboard advertisements. The present invention may include determining that a vehicle is approaching a display location. The present invention may then include receiving a plurality of data associated with the approaching vehicle. The present invention may then include resolving an advertisement to be displayed based on the received plurality of data. The present invention may then include establishing the display location based on the received plurality of data. The present invention may finally include projecting the resolved advertisement at the established display location.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
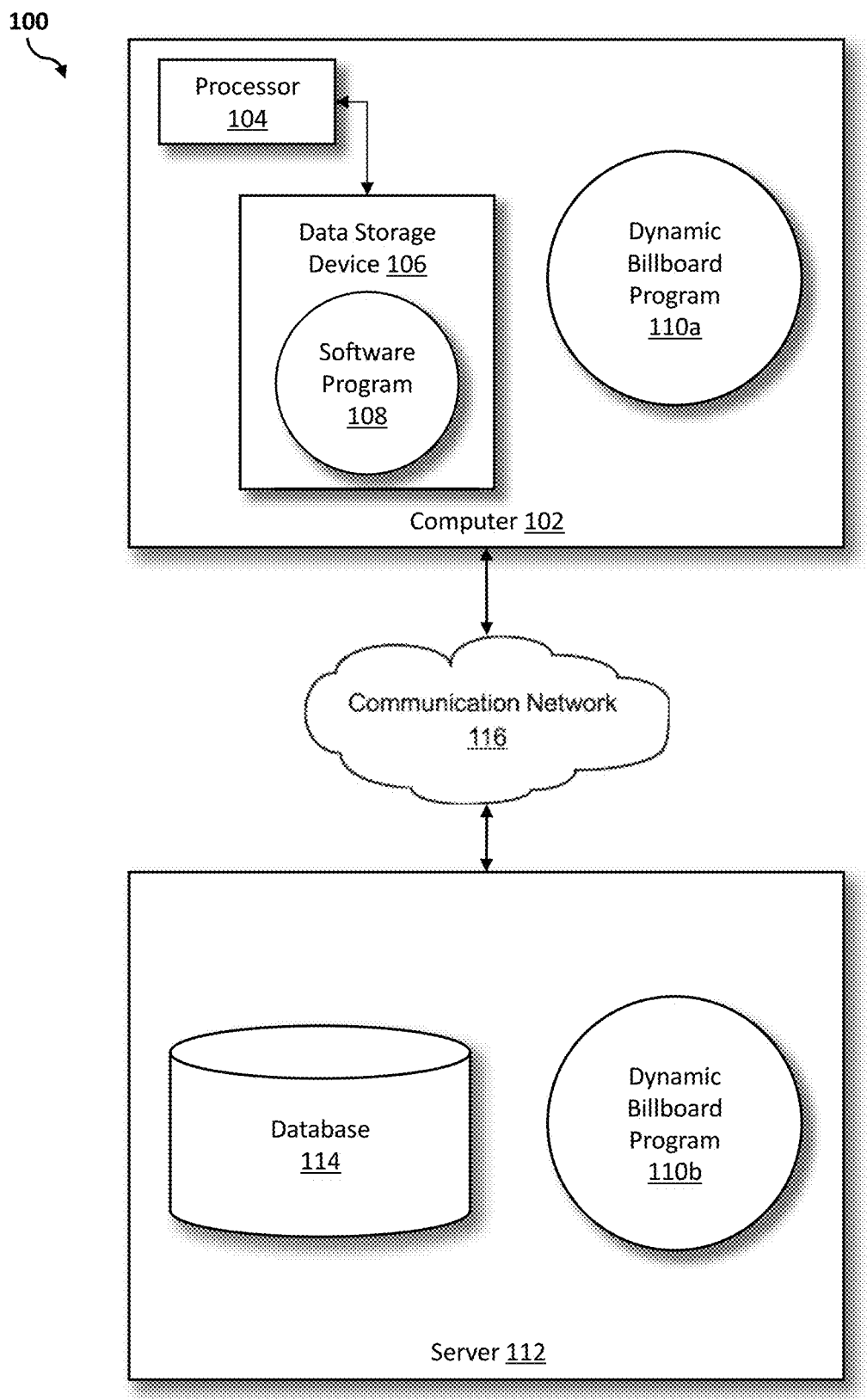
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamic billboard advertisements. As such, the present embodiment has the capacity to improve the technical field of electronic advertising by rendering advertisements (e.g., on billboards) responsive to an approaching vehicle. More specifically, the dynamic billboard advertisement system may determine that a vehicle is approaching. The dynamic billboard advertisement system may then receive an identification of the approaching vehicle. The dynamic billboard advertisement system may then resolve the advertisement to be displayed based on the received identification. The dynamic billboard advertisement system may then establish a display location and may finally project the advertisement.

As described previously, a dynamic billboard may be used for dynamically displaying advertisements along a roadside. Holographic technology may permit digital objects to be plotted in midair, on a screen, or in/on a holographic medium. The dynamic advertisement displayed on the billboard may be responsive to an approaching vehicle, or its driver or passenger, where applicable, and may be plotted either on an external billboard or within the vehicle's built-in screen. The orientation, shape, and dimension of the advertisement may also be dynamic.

However, static and electronic billboards which may frequently be used to display advertisements on a roadside may not have the ability to display digital multi-dimensional objects in midair. Therefore, it may be advantageous to, among other things, utilize a dynamic holographic billboard to display an array of advertisements in midair, on a screen, or in/on a holographic medium, based on determined viewer characteristics.

According to at least one embodiment, the dynamic billboard advertisement system may project the advertisement on a freestanding external billboard (e.g., a remote advertisement hologram). To do so, the dynamic billboard advertisement system may include a camera means and/or a transceiver means to identify the vehicle approaching directional range (e.g., coming within view of an upcoming billboard). The approaching vehicle may be equipped with a beacon or transponder that communicates key attributes of the vehicle and/or the vehicle occupants back to the dynamic billboard advertising system. The dynamic billboard advertisement system may then decide on which vehicle, driver, or passenger to focus the advertising. A prioritization scheme may be employed by the dynamic billboard advertisement system to decide which advertisement to be displayed. For example, if the approaching vehicle is determined to be over ten years old, an advertisement for a new car may be displayed. As another example, if a male in his mid-thirties is identified as driving a new Vehicle A, determined to be of good quality by the dynamic billboard advertisement program 110a, 110b, an advertisement for a nice restaurant may be displayed.

According to at least one embodiment, the dynamic billboard advertisement system may utilize a priority scheme for determining what advertisement to display in instances where there are multiple vehicles approaching the dynamic billboard at the same time. The dynamic billboard advertisement system may resolve the collected data and use analytics to determine an advertisement to display based on the collected data. For example, the priority scheme may be based on precedence afforded to the one or more advertisements associated with the given billboard, or the gender association of the one or more advertisements (that is, the priority scheme may give precedence to gender neutral advertisements in instances where there is a mixed population approaching the dynamic billboard, in order to appeal to a greater population of viewers). Likewise, in instances where the traffic density may be high (the number of vehicles or time of day associated with a "high density" scenario may be pre-programmed by the dynamic billboard advertisement system), the dynamic billboard advertisement system may not project advertisements which are based on identified vehicle attributes, but may display a pre-programmed suite of advertisements more likely to appeal to the general population.

According to at least one embodiment, the dynamic billboard advertisement system may also project the advertisement on a built-in screen within the approaching vehicle. In some instances, the hologram may also be rendered on the vehicle's windshield, where it may be small, substantially transparent, and offset from the driver's field of view to minimize safety implications.

According to at least one embodiment, in either instance previously mentioned, whether the advertisement is displayed within an approaching vehicle or on a freestanding billboard, the dynamic billboard advertisement system may be responsive to a remote controller (e.g., a private or public controller that may be situated on a roadside or in a roadside shop, among other locations). A remote controller may also be referred to as a hologram controller. As a vehicle approaches the hologram controller, the hologram controller may send data for a holographic rendering of an advertisement on the approaching vehicle's hologram display area (which may be a windshield, screen or other display device) or on a freestanding billboard, based on one or more external factors (e.g., whether the approaching traffic light is green or red). If an approaching vehicle is in close proximity to more than one hologram controller, data collected regarding the vehicle's occupants may be used to determine which advertisement to display. For example, collected data may include cell phone browsing history collected over Bluetooth® (Bluetooth and all Bluetooth-based trademarks and logos are trademarks or registered trademarks of Bluetooth SIG, Inc. and/or its affiliates) or wi-fi connectivity, facial recognition data to determine the occupant's gender and age, or vehicle recognition data. The prioritization scheme discussed above may also be utilized in conjunction with any collected data.

According to at least one alternate embodiment, a displayed advertisement may be operable at a traffic signal; or a personalized advertisement may be displayed in response to vehicle instruction.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic billboard advertisement program 110a. The networked computer environment 100 may also include a server 112 that is enabled to run a dynamic billboard advertisement program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic billboard advertisement program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dynamic billboard advertisement program 110a, 110b (respectively) to display dynamic advertisements on a freestanding billboard or on a vehicle's built-in screen based on various viewer characteristics and external factors. The dynamic billboard advertisement method is explained in more detail below with respect to FIGS. 2-4.

Figure 2:
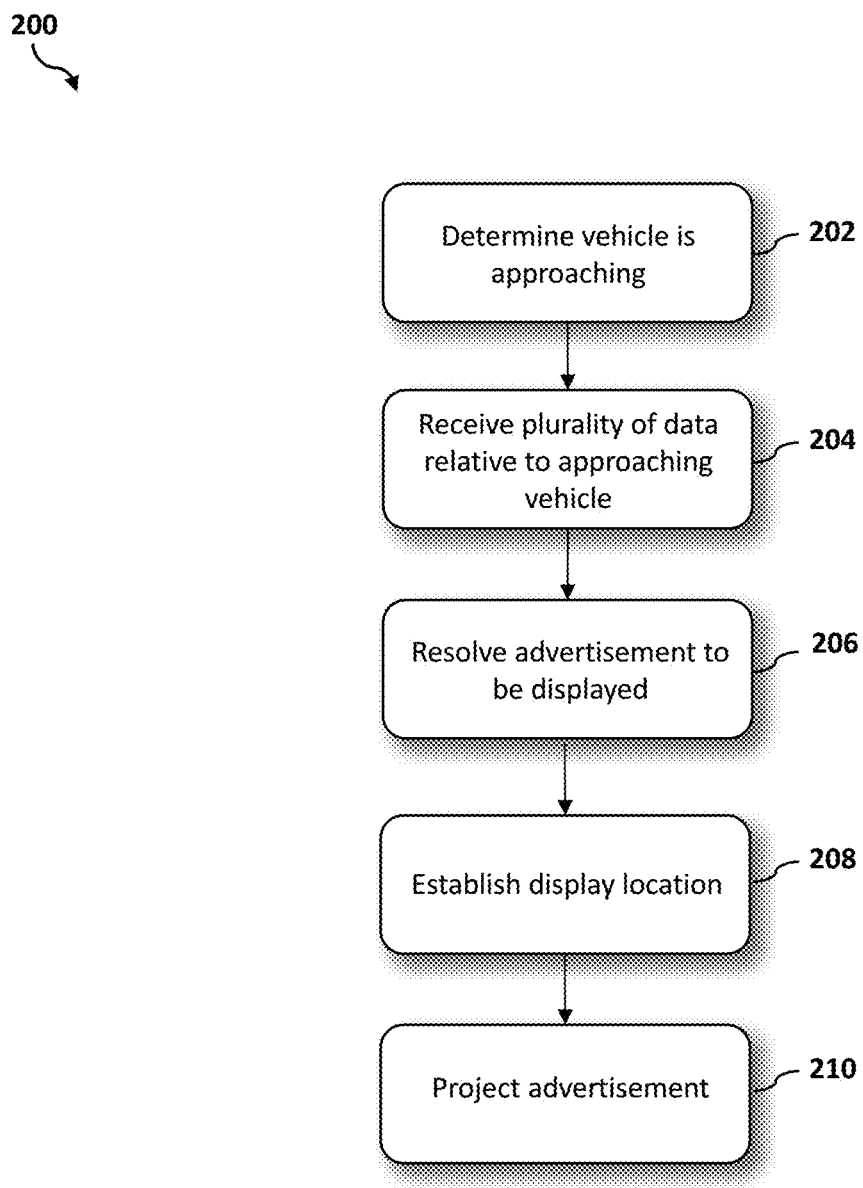
FIG. 2 is an operational flowchart illustrating a process for dynamic billboard advertisements according to at least one embodiment.

Referring now to FIG. 2, an operational flowchart illustrating the exemplary dynamic billboard advertisement process 200 used by the dynamic billboard advertisement program 110a and 110b according to at least one embodiment is depicted.

At 202, the dynamic billboard advertisement program 110a, 110b determines that a vehicle is approaching. The dynamic billboard advertisement program 110a, 110b may receive information from a camera (e.g., motion detection and image recognition), laser, Global Positioning System (GPS), or sensor (e.g., inductive, mechanical, or pneumatic) embedded within a road, among other means, to indicate that a vehicle is approaching an intersection or is in view of a given billboard. An embedded sensor may not be located directly in an intersection, however, may be located close thereto so that as a vehicle approaches the intersection, the embedded sensor may sense the moving vehicle at a low cost and may signal to the dynamic billboard advertisement program 110a, 110b that a vehicle is present. For example, a camera is attached to a dynamic billboard, situated in the same line of sight as the billboard, and is installed directly under it. The attached camera determines via motion detection and image recognition that a vehicle is approaching.

At 204, the dynamic billboard advertisement program 110a, 110b receives data relative to the approaching vehicle. A camera means, for example, may capture the image of the vehicle and a processing means may process the captured image (e.g., determine the type of vehicle based on the vehicle's brand name or logo or the shape of vehicle, the age of the vehicle, whether there are any passengers, the age of the driver and passengers, and the gender of the driver and passengers, among other determinations). The camera means may have the ability to zoom in and out so that the body of the vehicle may be captured in one shot and any occupants may be captured in another. Based on the processed and collected image information, several means may be utilized to identify the target audience. One such means may be based on identification of the one or more vehicles approaching the billboard or intersection (e.g., car make, car year, speed of car). Another such means may be based on identification of the occupants inside the one or more vehicles. For example, by capturing an image of the occupants of the vehicle the dynamic billboard advertisement program 110a, 110b may determine whether an occupant has fine lines on his or her face thereby indicating that the occupant may be young or old. Yet another such means may be based on external factors such as the time of day and whether the vehicle is traveling with or against the main flow of traffic.

In instances where the image processing means associated with the dynamic billboard advertisement program 110a, 110b may not be able to identify characteristics of the vehicle and/or its occupants (e.g., due to foggy weather, dark driving conditions, or vehicle headlights causing the camera to be washed out), the dynamic billboard advertisement program 110a, 110b may refer to a probability matrix of vehicles or occupants likely to pass through a given intersection based on previously collected data. The probability matrix of previously collected data may permit the dynamic billboard advertisement program 110a, 110b to determine a likely vehicle and proceed as though that vehicle is the one that traveled past the given camera.

The collected data may also include cell phone data of an occupant of an approaching vehicle, where that occupant is connected via a communications network 116 to a Bluetooth® or wi-fi network shared by the holographic billboard. In one instance, the holographic billboard may put out a wi-fi signal and devices of vehicles entering the wi-fi network (e.g., within range of the wi-fi signal) may connect to the wi-fi network and may effectuate the transfer of cookies, metadata, and information requests stored locally on the occupant's device. However, this transfer may be done without a wi-fi signal and with a Bluetooth® signal instead. Both Bluetooth® and wi-fi may require a close colocation of the billboard and connected device. The dynamic billboard advertisement program 110a, 110b may also permit an occupant to utilize a cellular network and GPS to indicate that the occupant is located near a given billboard. Connection over a cellular network may be less location specific, as the device may not be required to be in close proximity to a given billboard in order to transfer data to the billboard over a cellular network.

Additionally, an occupant may transmit over a communications network 116 (e.g., Bluetooth®, wi-fi, or cellular) a special request for a given advertisement. The special request may become high priority for the dynamic billboard advertisement program 110a, 110b, based on the fact that the occupant is now identifying himself or herself as part of a specific market and is no longer a general element of an unknown market. That is to say that in instances where an occupant indicates that he or she is searching for a certain type of item, the dynamic billboard advertisement program 110a, 110b may receive this information and recognize that an advertisement concerning the searched for item or its general class may be of particular interest and appeal.

Next, at 206, the dynamic billboard advertisement program 110a, 110b resolves the advertisement to be displayed. In doing so, the dynamic billboard advertisement program 110a, 110b may consider one or more factors, the weight of which may change given time of day, whether the advertisement may be displayed during rush hour travel, and the amount of money being paid for a given advertisement, among other factors. The dynamic billboard advertisement program 110a, 110b may utilize an analytics-based algorithm, whereby structured and unstructured data may be discovered and interpreted, and meaningful patterns may be communicated; or a cognitive computing-based algorithm, whereby data mining, pattern recognition, and natural language processing may be utilized to create a self-learning system. For example, during rush hour travel, there may be a high density of vehicles on the road, which may be moving slower, and whose occupants may have more time to focus on the advertisement being displayed. This may become an advertiser's prime advertising timeslot because visibility will be high and the number of vehicles driving past the billboard without having time to notice the advertisement will be low. A prioritization scheme utilized by the dynamic billboard advertisement program 110a, 110b may incorporate the one or more factors discussed above to determine that the prime advertising timeslot should be given to the advertiser who is paying the most amount of money for their exposure (e.g., the profit generated from a given advertisement may be considered).

If there are multiple vehicles approaching a holographic billboard at the same time, the dynamic billboard advertisement program 110a, 110b may utilize the same prioritization scheme described above to resolve what advertisement to display. For example, there are three vehicles approaching a holographic billboard and the dynamic billboard advertisement program 110a, 110b determines that the first vehicle is a 2017 Model A vehicle, the second vehicle is a 1999 Model B vehicle, and the third vehicle is a 1995 Model C vehicle. The dynamic billboard advertisement program 110a, 110b further determines that the first vehicle contains one female driver of race X, approximately thirty years old; the second vehicle contains one male driver of race Y, approximately 60 years old, and two female children under five years old, also of race Y, seated in the backseat; and the third vehicle contains two males of race Z, approximately 40 years old. The dynamic billboard advertisement program 110a, 110b also determines that the traffic light situated next to the holographic billboard is currently green, and based on the time that the vehicles passed the camera means, all three vehicles will approach the holographic billboard just as the light is turning red. Therefore, the dynamic billboard advertisement program 110a, 110b resolves to display two advertisements during the minute and a half that the vehicles will be stopped at the red light. Since no information was received via Bluetooth®, wi-fi, or over the cellular network, the dynamic billboard advertisement program 110a, 110b resolves to display a car advertisement for the new Model A truck based on the fact that two of the three vehicles approaching the holographic billboard are over fifteen years old. The second advertisement that the dynamic billboard advertisement program 110a, 110b displays is based on the advertiser's contract with the holographic billboard's owner and the fact that the company wishes to prioritize advertisements from this advertiser. In this instance, the holographic billboard's owner has its own internal metrics for determining what advertiser to prioritize, given a particular demographic and received device information.

Similarly, the internal metrics of the holographic billboard's owner may dictate what advertisement may be displayed on a holographic billboard or an internal screen when there are no vehicles on the road. For example, the owner of the holographic billboard may elect to give free advertising time to charity.

Next, at 208, the dynamic billboard advertisement program 110a, 110b establishes a display location. In doing so, the dynamic billboard advertisement program 110a, 110b may make a determination as to whether an approaching traffic light is green or red. This determination may be made directly, using image recognition by the dynamic billboard advertisement program's 110a, 110b camera means, or indirectly, also using image recognition to determine whether the vehicle is stopped or moving. For example, if the speed of the vehicle is determined to be more than a predefined threshold of five miles per hour, then the vehicle is said to be moving and the light is said to be green. In the event that the traffic light is green, the advertisement resolved to be displayed at 206 may be displayed on a freestanding billboard. By contrast, if the traffic light is determined to be red, the advertisement resolved to be displayed at 206 may be displayed on the vehicle's built-in screen. The advertisement determined at 206 to have the highest priority may also be displayed on a freestanding billboard, and one or more advertisements of lower priority may be displayed on the vehicle's built-in screen, based on the collected vehicle and occupant data.

Lastly, at 210, the advertisement is projected. The advertisement may be displayed on a freestanding billboard using a display means of the holographic billboard itself (e.g., a digital billboard) or a holographic screen with a camera means used in projecting the holographic image onto a holographic screen. The advertisement may also be displayed on the vehicle's built-in screen (e.g., entertainment system).

Figure 3:
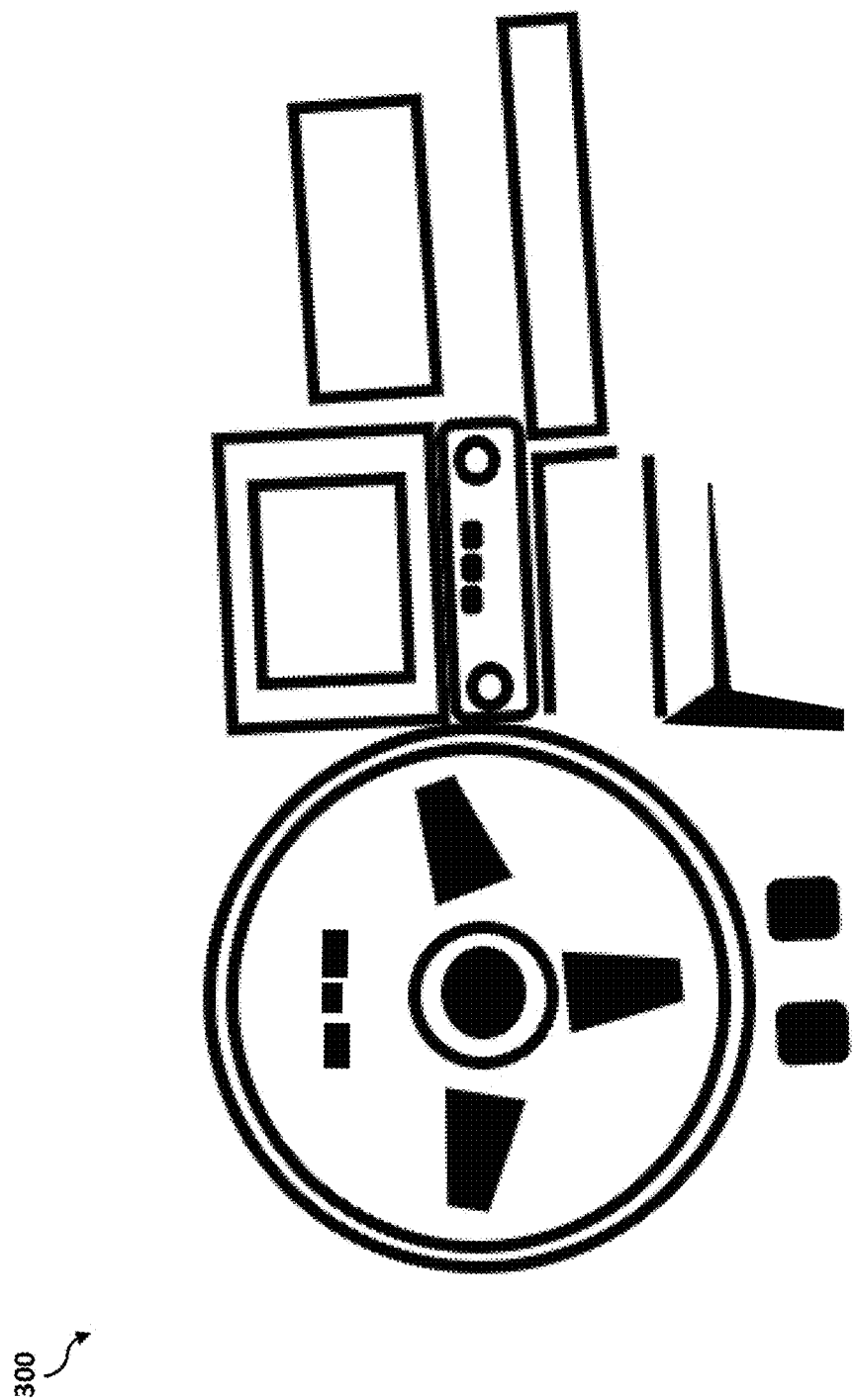
FIG. 3 illustrates a built-in screen used by the dynamic billboard advertisement process according to at least one embodiment.

Referring now to FIG. 3, a built-in screen 300 used by the dynamic billboard advertisement process according to at least one embodiment is depicted. A built-in screen may be located inside a vehicle, as shown to the right of the steering wheel, and may be installed by the vehicle's manufacturer. A built-in screen may also be installed by the vehicle's owner. A built-in screen may be of any size and may be located anywhere inside the vehicle where it may be viewed by the vehicle's one or more occupants. For example, the built-in screen here is depicted in the center of the vehicle's front console.

Figure 4:
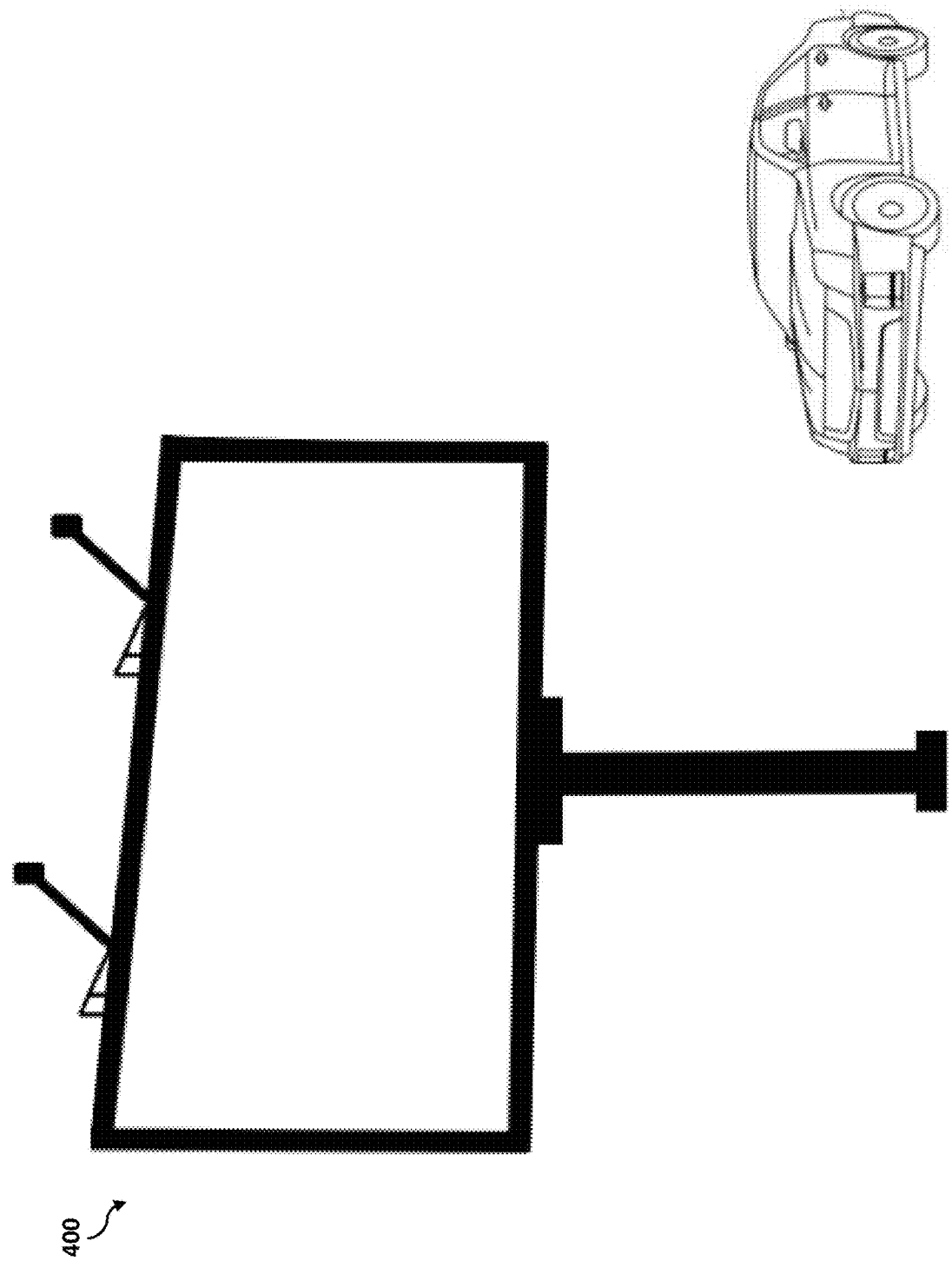
FIG. 4 illustrates an external billboard used by the dynamic billboard advertisement process according to at least one embodiment.
Figure 4:
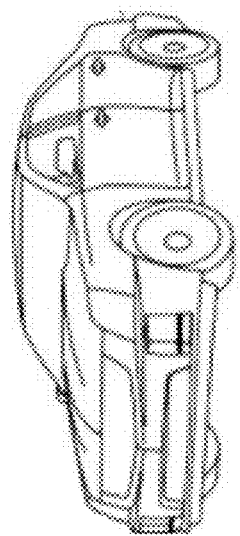

Referring now to FIG. 4, an external billboard 400 used by the dynamic billboard advertisement process according to at least one embodiment is depicted. An external billboard may be pre-installed along a roadside where it may be visible to occupants of oncoming vehicles. External billboards may be of varying sizes and shapes and may also be of varying technological capability. Installation of external billboards may be independent of the dynamic billboard advertisement program 110a, 110b.

It may be appreciated that FIGS. 2-4 provide only an illustration of one embodiment and do not imply any limitations with regard to how different embodiments may be implemented. Many modifications to the depicted embodiment(s) may be made based on design and implementation requirements. The dynamic billboard advertisement program 110a, 110b is described here in the context of vehicular traffic, however, it may also be utilized in other contexts, such as pedestrian traffic both on and off a roadway.

Figure 5:
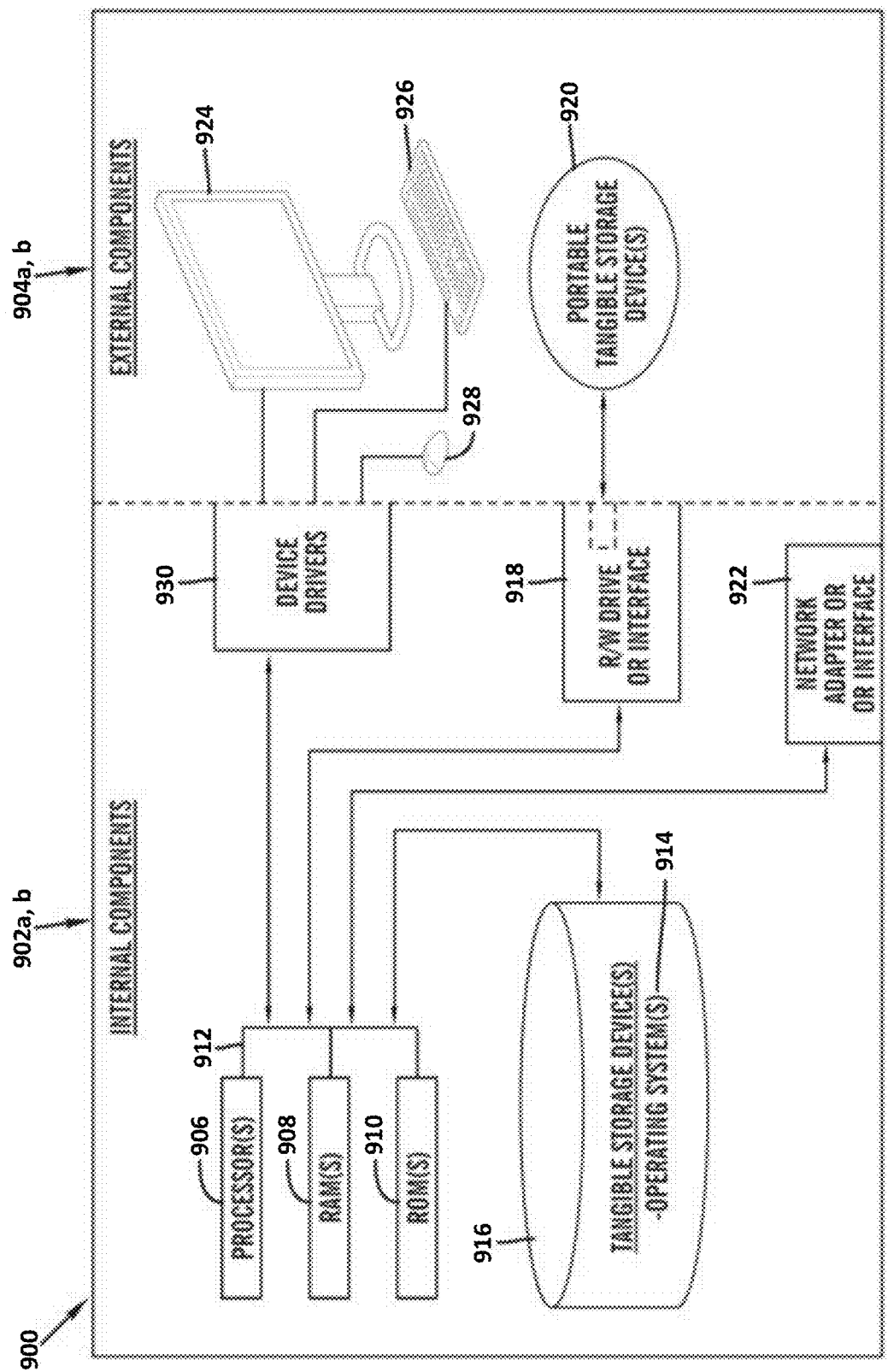
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 5. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the dynamic billboard advertisement program 110a in client computer 102, and the dynamic billboard advertisement program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the dynamic billboard advertisement program 110a and 110b can be stored on one or more of the respective portable computer-readable tangible storage devices 920, read via the respective R/W drive or interface 918, and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the dynamic billboard advertisement program 110a in client computer 102 and the dynamic billboard advertisement program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the dynamic billboard advertisement program 110a in client computer 102 and the dynamic billboard advertisement program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A virtual private network (VPN) is a form of hybrid cloud consisting of a combination of public and private information technology (IT) infrastructures. A VPN extends a private network across a public network and enables users to send and receive data across shared or public networks as if their computing devices were directly connected to the private network.

A cloud computing environment is service oriented with a focus on statelessness, low coupling, modularity, and semantic interoperability. At the heart of cloud computing is an infrastructure comprising a network of interconnected nodes.

Figure 6:
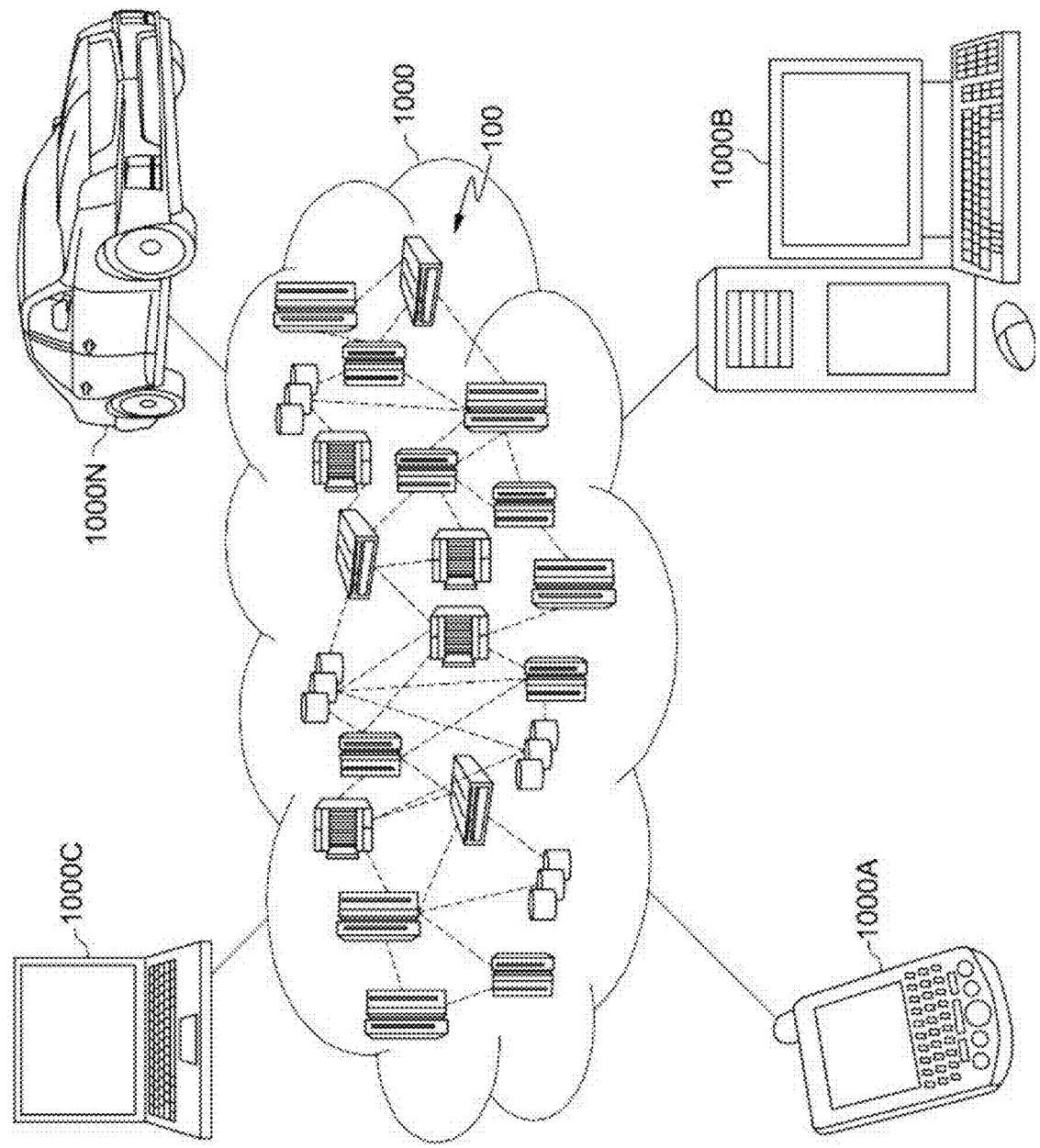
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
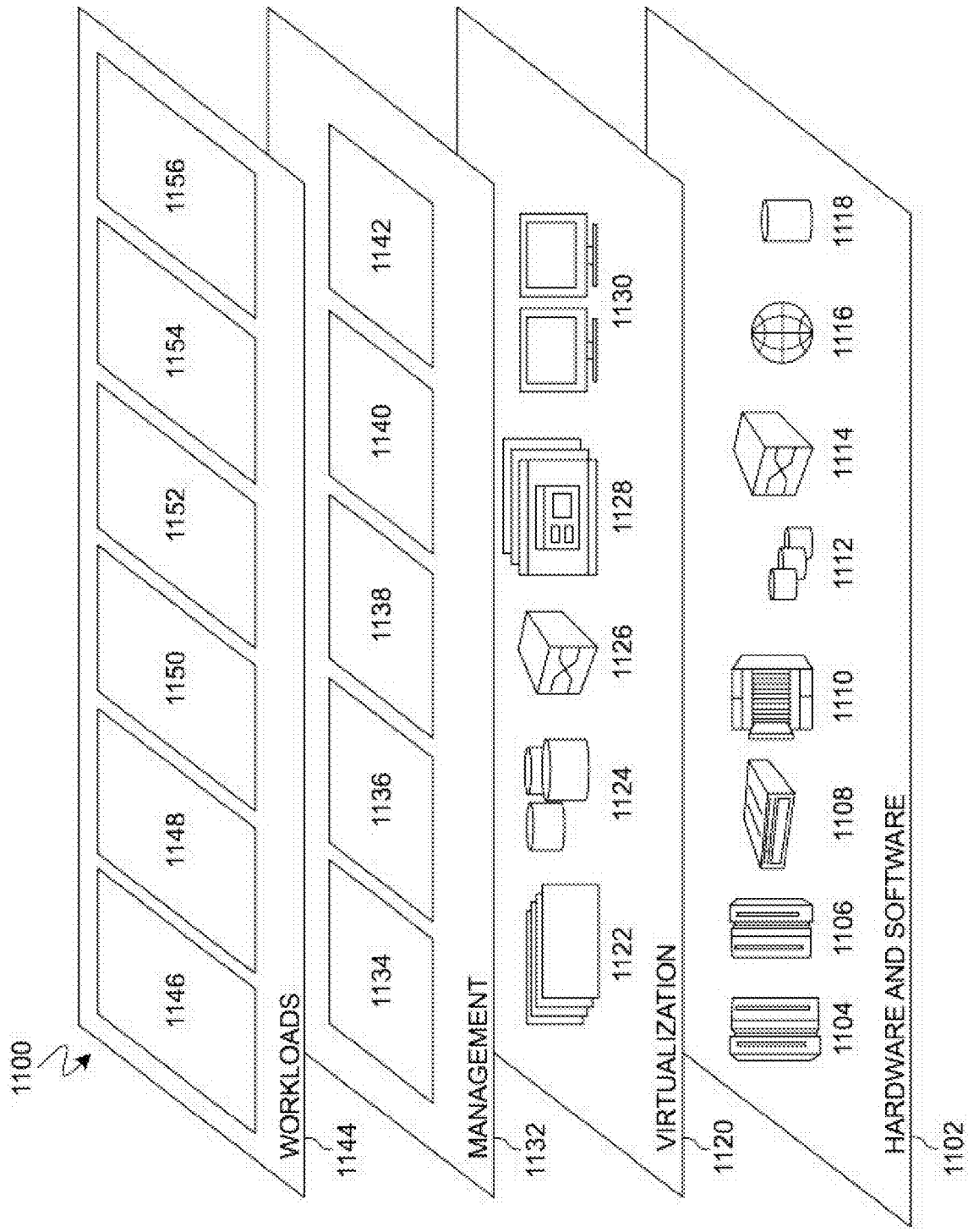
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and dynamic billboard advertisement 1156. A dynamic billboard advertisement program 110*a*, 110*b* provides a way to display dynamic advertisements on a freestanding billboard or on a vehicle's built-in screen based on various viewer characteristics and external factors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for displaying dynamic advertisements, the method comprising:
   determining that a vehicle is approaching a display location;
   receiving a plurality of data that identifies the approaching vehicle and one or more passengers occupying the approaching vehicle;
   selecting an advertisement to be displayed based on the received plurality of data;
   establishing the display location between a plurality of different display locations based on the received plurality of data, wherein the plurality of different display locations comprise an in-vehicle display within the approaching vehicle and an out-of-vehicle display, and wherein the out-of-vehicle display includes a holographic device that holographically projects the selected advertisement outside of the approaching vehicle and on the approaching vehicle; and
   displaying the selected advertisement at the established display location.

2. The method of claim 1, wherein determining that the vehicle is approaching the display location comprises utilizing a camera, a laser, or an inductive sensor.

3. The method of claim 1, wherein selecting the advertisement to be displayed based on the received plurality of data, further comprises analyzing a plurality of external factors, wherein the external factors include a time of day factor, a number of approaching vehicles factor, a rush hour travel time factor, and a profit generated factor.

4. The method of claim 1, wherein establishing the display location based on the received plurality of data further comprises:
   determining that the approaching vehicle will be affected by a red traffic light.

5. The method of claim 4, wherein determining that the approaching vehicle will be affected by a red traffic light further comprises measuring a speed of the approaching vehicle.

6. The method of claim 1, wherein establishing the display location based on the received plurality of data further comprises:
   determining that the approaching vehicle will encounter a green traffic light.

7. The method of claim 1, wherein the established display location is selected from the group consisting of a freestanding digital billboard, a freestanding holographic billboard, and a built-in vehicle screen.

* * * * *